United States Patent
McDonnell et al.

(10) Patent No.: US 7,835,724 B2
(45) Date of Patent: Nov. 16, 2010

(54) METHOD AND APPARATUS FOR AUTHENTICATING SERVICE TO A WIRELESS COMMUNICATIONS DEVICE

(75) Inventors: James Thomas Edward McDonnell, Malmesbury (GB); Ian Robert Johnson, Bristol (GB); Amanda Richardson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1074 days.

(21) Appl. No.: 10/657,237

(22) Filed: Sep. 9, 2003

(65) Prior Publication Data
US 2004/0152447 A1 Aug. 5, 2004

(30) Foreign Application Priority Data
Sep. 10, 2002 (GB) ................. 0220930.2

(51) Int. Cl.
*H04M 1/66* (2006.01)
(52) U.S. Cl. .................. 455/411; 455/410; 455/432.1; 455/432.3; 455/444
(58) Field of Classification Search ................. 455/410, 455/411, 432.1, 510, 509, 432.3, 444; 379/189, 379/161, 184, 168; 709/219, 229
See application file for complete search history.

(56) References Cited

U.S. PATENT DOCUMENTS

| | | | | |
|---|---|---|---|---|
| 5,598,459 A | * | 1/1997 | Haartsen ................ | 455/411 |
| 6,259,405 B1 | * | 7/2001 | Stewart et al. ........... | 342/457 |
| 6,785,729 B1 | * | 8/2004 | Overby, Jr. et al. ....... | 709/229 |
| 6,853,729 B1 | * | 2/2005 | Mizikovsky ............. | 380/249 |
| 6,856,800 B1 | * | 2/2005 | Henry et al. ............. | 455/411 |
| 7,174,564 B1 | * | 2/2007 | Weatherspoon et al. ..... | 726/2 |
| 2001/0052083 A1 | | 12/2001 | Willins et al. | |
| 2002/0059453 A1 | * | 5/2002 | Eriksson et al. .......... | 709/238 |
| 2002/0077060 A1 | * | 6/2002 | Lehikoinen et al. ....... | 455/41 |
| 2002/0087677 A1 | * | 7/2002 | Maeda et al. ............ | 709/223 |
| 2002/0174335 A1 | * | 11/2002 | Zhang et al. ............. | 713/168 |
| 2002/0191575 A1 | * | 12/2002 | Kalavade et al. ......... | 370/338 |
| 2002/0198937 A1 | * | 12/2002 | Diwan et al. ............ | 709/203 |
| 2003/0003933 A1 | * | 1/2003 | Deshpande et al. ........ | 455/510 |
| 2003/0046541 A1 | * | 3/2003 | Gerdes et al. ........... | 713/168 |
| 2003/0051041 A1 | * | 3/2003 | Kalavade et al. ......... | 709/229 |
| 2003/0092450 A1 | * | 5/2003 | Juppi et al. ............. | 455/456 |
| 2003/0114158 A1 | * | 6/2003 | Soderbacka et al. ....... | 455/436 |
| 2004/0019584 A1 | * | 1/2004 | Greening et al. .......... | 707/1 |

(Continued)

FOREIGN PATENT DOCUMENTS

EP  1 161 031 A2  5/2001

(Continued)

OTHER PUBLICATIONS www.cell-loc.com/how_tech.html, downloaded Dec. 18, 2008, 2 pages.

(Continued)

*Primary Examiner*—Ajit Patel
*Assistant Examiner*—Khai M Nguyen

(57) ABSTRACT

A cellular communications service provider authenticates a provider of a location-dependent service, such as a wireless hotspot. Once the cellular communications service provider is aware of potential use of the service by the user, it authenticates the service provider and provides an authentication to the user. Users can thus avoid untrustworthy providers of local services.

24 Claims, 1 Drawing Sheet

U.S. PATENT DOCUMENTS

| | | | |
|---|---|---|---|
| 2004/0029529 A1* | 2/2004 | Kobayakawa et al. | 455/12.1 |
| 2004/0058717 A1* | 3/2004 | McDonnell et al. | 455/567 |
| 2004/0243846 A1* | 12/2004 | Aboba et al. | 713/201 |
| 2004/0264699 A1* | 12/2004 | Meandzija et al. | 380/270 |
| 2005/0010824 A1* | 1/2005 | Yuan | 713/202 |
| 2006/0183467 A1* | 8/2006 | Stewart | 455/414.3 |

FOREIGN PATENT DOCUMENTS

| | | | |
|---|---|---|---|
| EP | 1 081 895 A1 | 7/2001 | |
| GB | 2 367 213 A | 3/2002 | |

OTHER PUBLICATIONS www.cursor-system.com/sitefiles/cursor/tech_eotd.htm, downloaded Dec. 18, 2008, 3 pages.

www.signalsoftcorp.com/products/index.html, downloaded Dec. 18, 2008, 2 pages.

* cited by examiner

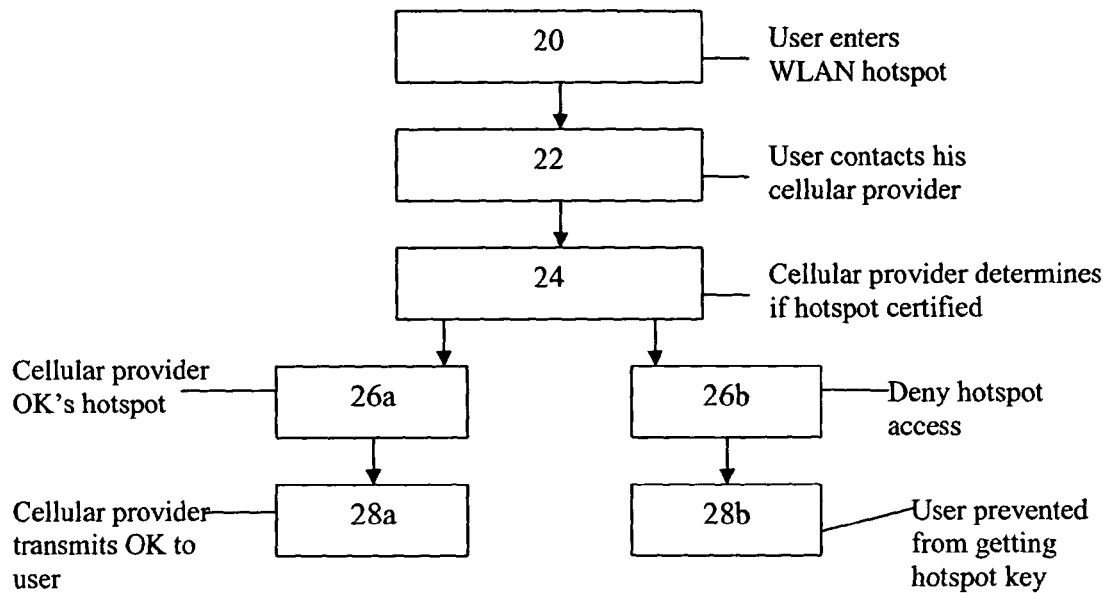
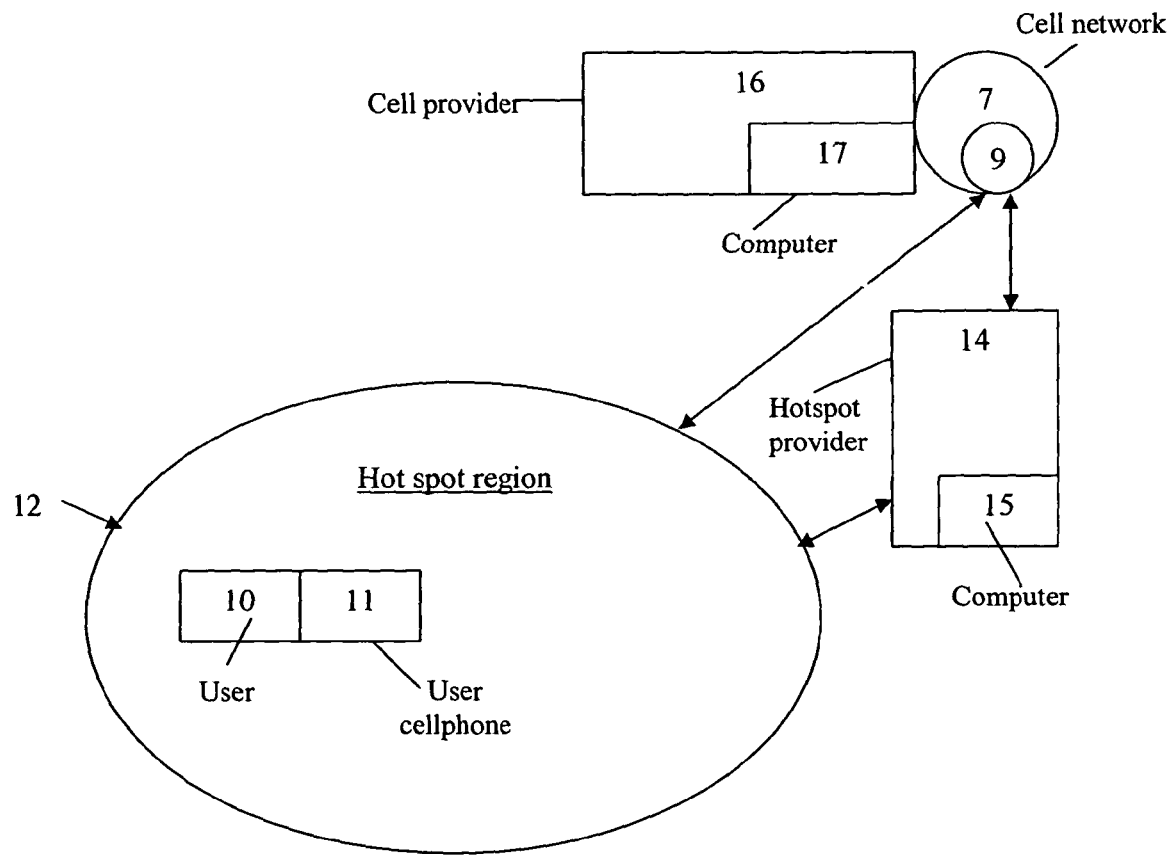

METHOD AND APPARATUS FOR AUTHENTICATING SERVICE TO A WIRELESS COMMUNICATIONS DEVICE

FIELD OF THE INVENTION

The present invention relates to authenticating service to a wireless communications device. The invention relates particularly to authenticating use of hotspot wireless communications device services provided by a wireless network.

BACKGROUND OF THE INVENTION

It has been predicted that wireless local area networks (WLANs) will soon provide a significant proportion of the wireless access to computer networks and/or the Internet via "hotspots", which enable a user to have wireless connection by radio frequency (RF) communication to a computer network when the user is in a designated area forming the "hotspot". The hotspots may form part of a cellular telecommunications network and may be an extension of the existing cellular telecommunication networks already widely available.

A problem with accessing WLANs via hotspots is that a user may be unaware of the suitability of the provider of a particular hotspot. Similarly, the provider of a hotspot may have problems in determining whether a request for use of the hotspot by a user should be accepted.

In the following a hotspot is an area where a wireless communication to a WLAN can take place, the area being geographically limited to being approximately tens of meters in size. Several hotspots may be created together in a cluster to serve a site having a size larger than a single hotspot, such as an airport, hotel, conference centre, office building or the like. A hotspot typically allows access to services or information etc on the Internet.

SUMMARY OF THE INVENTION

According to a first aspect, the present invention provides a method wherein a cellular communications service provider authenticates a provider of a service running at a wireless hotspot. The method comprises receiving an indication of potential use of a specified wireless hotspot from a user. The trustworthiness of the provider of the service is verified with a party independent from said service provider. On successful verification of the provider of the service, the user is provided with a confirmation that the provider of the service is authenticated by the cellular communications service provider.

According to a second aspect, the invention provides a computer system for a cellular telecommunications provider. The system comprises a processor adapted to: (1) receive an indication of potential use of a specified wireless hotspot from a user; (2) identify services available at the specified wireless hotspot; (3) authenticate providers of the services available at the specified wireless hotspot; and (4) prepare authentication information for use to the user.

According to a third aspect, the invention provides a method wherein a cellular telecommunications provider authorises a user to use a location-dependent service. The method comprises: tracking the location of a user via a wireless communications device of the user; determining that the user is or will be within an operating range of the location-dependent service; authenticating a provider of the service; and providing authentication of the provider of the service to the user.

In further aspects, the invention provides appropriate apparatus, and provides suitably programmed computers and data carriers carrying code adapted to program computers suitably.

BRIEF DESCRIPTION OF THE DRAWINGS

For a better understanding of the invention and to show how the same may be brought into effect, specific embodiments will now be described, by way of example, and with reference to the accompanying drawings, in which:

FIG. 1 is a flow diagram of a preferred method of certifying a hotspot user; and FIG. 2 is a schematic diagram of a user and a WLAN hotspot.

DETAILED DISCUSSION OF THE DRAWINGS

It is predicted that wireless local area networks (WLANs) will soon provide a significant proportion of the wireless access to the Internet via hotspots. A method is described herein with reference to FIG. 1 whereby a user can certify the trustworthiness of a WLAN hotspot provider by using another trusted party, such as a cellular communications service provider.

The method described in relation to FIG. 1 demands that a WLAN hotspot provider and service providers providing services over the WLAN hotspot are vetted, i.e., certified, by, for example, a cellular telecommunications provider. This could apply to a cellular telecommunications provider of any type (including GSM, GPRS and 3G providers). The WLAN hotspot provider and service provider are to be vetted as bona fide companies with whom the cellular telecommunications service provider allows users of its services to communicate. It is possible that in the limiting case, the cellular telecommunications service provider could also be the WLAN hotspot provider, in which case the cellular provider would obviously always positively vet itself.

The method works as follows.

In FIG. 1 a user enters a WLAN hotspot during operation. The user is typically unsure of a service running at the hotspot—either the trustworthiness of the WLAN operator or of a service provider providing further services over the WLAN hotspot. The user then contacts his cellular telecommunications service provider during operation—this telecommunications service provider being trusted by the user to at least some extent. The contact is made by a user placing a data call with a cell phone to the cellular telecommunications service provider. The call is generally made automatically once the user expresses interest in using the hotspot by pressing—for instance—a "YES" button on his cell phone. The cell phone then sends its location information and the details of the hotspot service provider to the cellular telecommunications service provider. If the cellular telecommunications service provider has certified the hotspot provider at that particular location then the response back to the user cell phone would be affirmative to use that hotspot and provider.

The request for certification of the service can be initiated in other ways than manual confirmation of the user as described above. As will be described below, awareness of the existence of a local service may be enough to trigger a certification/authentication step from the cellular telecommunications service provider. Alternatively, the user's cellphone may be adapted such that it cannot use WLAN services (any WLAN services, or WLAN services of a particular type) without confirmation from the cellular telecommunications service provider or its designate if the service provider verifies that the WLAN service concerned is legitimate. This confirmation can be provided, for example, in the form of a key to activate the relevant functionality at the cell phone (use of keys in such authentication is described further below). The cell phone may be adapted so that such confirmation of certification or authentication is always required before use of a WLAN service of the relevant type, or may be adapted so that this could be overridden by the user (who would then, in effect, be taking responsibility for making the security decision about the WLAN services himself or herself).

The trusted cellular telecommunications service provider is aware of the location of the user by virtue of the request made, since the user location is an integral part of cellular telecommunications. Furthermore, more specific location information can be obtained to give the position of a user within a particular cell using signal strength in adjacent cells to triangulate a user's location. More detail of this can be obtained from Cambridge Positioning Systems (UK) (see www.cursor-system.com/sitefiles/cursor/tech_eotd.htm), Signalsoft (see www.signalsoftcorp.com/products/index.html), or Cell-loc (see www.cell-loc.com/how_tech.html). Thus the movements of a user or potential user can be tracked.

It is also likely that the trusted cellular telecommunications service provider has details of the location of the hotspot, particularly if there is an information sharing agreement between the cellular telecommunications service provider and the hotspot provider. The information is typically tabulated to show a hotspot name, an owner/operator and a location on a suitable database. Thus, the cellular telecommunications service provider, knowing the location of the hotspot can vet the WLAN hotspot as being offered by a trusted WLAN hotspot provider, by cross-referencing user location with known hotspot location information.

By using this information, a user is provided in advance with information relating to the location of known hotspots that have previously been vetted by a user's cellular telecommunications or hotspot service provider. The cell phone and the cellular provider know the whereabouts of a given cell phone using location finding technology referred to above. Knowing the location of a cell phone (as described above) the cellular provider lets the user know about hotspots in his/her vicinity. In a more advanced system the cellular operator senses the direction a user is moving (e.g. down a road/motorway) and predictively alert the user to upcoming hotspots.

Also, information can be provided to a user giving the direction or location of a nearest (or a list of nearest) hotspots that a user may wish to use. This information could easily be derived from a user's location information and hotspot location information, with a difference value being calculated.

The certification or vetting of the hotspot by the cellular provider (operation 24) can be carried out by a number of methods, a non-limiting example of which is if the hotspot provider or service provider over the hotspot is in a list of approved hotspot providers or service providers held by the cellular telecommunications service provider. It should be noted that the certification or vetting (which may be a simple authentication, or also require the service provider concerned to meet certain criteria) need not be provided by the cellular telecommunications service provider directly, but simply by a party whom the user ultimately trusts. This may be a party or one of a group of parties identified by the user, or a party trusted by the cellular telecommunications service provider (either directly or indirectly).

If operation 24 positively certifies the hotspot provider, then the trusted cellular telecommunications service provider (during operation 26a) confirms to the user that the user can access the relevant service or services provided at the WLAN hotspot. This can be a simple confirmation, sent (preferably) over a secure cellular telecommunications link to the user (at operation 28a in FIG. 1), advantageously by encrypted communication between cellular telecommunications service provider and user. This could also be a key unlocking the relevant WLAN-related functionality at the cellphone. It could also include a key to provide to the service provider at the hotspot to use the hotspot services. Such a key can be an encrypted sequence, using an existing encryption scheme such as public key infrastructure (PKI). The exchange of keys is a standard technique for authentication. Consider two entities: A and B. A sends a code sequence to B, and asks B to encrypt it with B's secret key. B does so, and sends back the encoded sequence to A. A then checks this against it's own calculated coding of the sequence it sent to B. If both sequences agree then A knows B is authenticated Since the cellular telecommunications service provider knows the location of the user and also the hotspot (assuming the information sharing agreement mentioned above is in place) then the vetting of the WLAN hotspot provider and service providers on the WLAN hotspot can be carried out automatically without the user having to make a specific request for verification of the WLAN hotspot. The request for certification would be made automatically as soon as the user requests service from the hotspot.

If the cellular provider of the user does not positively certify the hotspot during operation 24 as having not been a trusted hotspot provider, the cellular provider derives a signal indicating access to the hotspot is denied (operation 26b) and the user is not given the key (indicated by operation 28b) to prevent use of the hotspot by the user.

The method described above gives users security and trust in accessing a WLAN hotspot and in the services provided through the WLAN hotspot and inhibits "rogue" hotspot providers. Also, advance information about hotspots that a user is approaching can provide increased confidence to a user, as well as providing a more efficient service. If the cellular service provider with its location-sensing technology locates a user and his direction then the cellular provider can pre-authenticate the likely hotspots that the user will pass-through on his journey and alert the user to the presence and authenticity of these hotspots.

The user can access the hotspot and a computer network associated therewith with a cellular telecommunications device, which may be a portable computer, or laptop, a personal digital assistant or other mobile computing device.

In the environment of FIG. 2, a user 10 having a communications device 11 (such as a cell phone, laptop computer, a personal data assistant (PDA) or similar device) is within the hotspot region 12. A hotspot provider 14 using a computer 15 communicates with the hotspot 12, as does a cellular telecommunications service provider 16 using a computer 17, the latter also communicating with the hotspot provider 14. The communication by user 10 and hotspot 14 with the cellular telecommunications provider 16 is done via a node 9 of a cellular telecommunications network 7. Computer 17 of the cellular communications service provider 16, in this arrangement, is programmed to request reception, verification and key transmission.

The hotspot services described herein and the telecommunications networks are performed using computers, such as computers 15 and 17 above, programmed with suitable software.

The system and method can also track a user as described above, prior to allowing entry of the user to a building or the like. The building would correspond to the wireless service in the above embodiments. A user would be tracked as he approached the building, and would be allowed access to the building on making a request. The request (or potential request) would be one about which a controller of the building access would be aware, given the tracking of the user. Authentication and certification issues for building services would then be addressed.

The certification methods described herein address the problem of hotspot services potentially being provided by unknown. Thus a, potentially automatic, method is disclosed whereby vetting, i.e. certifying, of a provider of services at a hotspot is achieved.

The invention claimed is:

1. A method for operating a communications device capable of communicating with a cellular communications service provider and a wireless computer network service provider, the method comprising:
    receiving an indication of potential interfacing of the communications device with a wireless hotspot, wherein the wireless hotspot comprises an interface through which the communications device is configured to communicate with a computer network, wherein the interface is facilitated by a wireless computer network service provider;
    sending a request over a cellular communications network to the cellular communications service provider for verifying the trustworthiness of the provider of the wireless computer network service that provides the interface to the computer network; and
    on successful verification of the provider of the wireless computer network service, receiving a confirmation over the cellular communications network that the provider of the wireless computer network service is authenticated by the cellular communications service provider.

2. A method as claimed in claim 1, wherein the wireless computer network service is a service running over an infrastructure of the wireless hotspot and the provider of the wireless computer network service is not the provider of the wireless hotspot infrastructure.

3. A method as claimed in claim 1, wherein the confirmation comprises a key enabling the communications device to use the wireless computer network service provided by the wireless computer network provider.

4. A method as claimed in claim 1, further comprising:
    sending location information representing the location of the communications device and information of the wireless computer network service to the cellular communications service provider.

5. A method as claimed in claim 4, further including receiving information concerning the location of one or more hotspots close to the user.

6. A method as claimed in claim 4, wherein the indication of potential use is determination that the hotspot is within present or future range of the user.

7. A method as claimed in claim 6, wherein authentication of the provider of the wireless computer network service commences before the request is sent to the cellular communications service provider.

8. A method as claimed in claim 1, wherein the indication of potential interfacing of the communications device with a wireless hotspot is a positive request from the user.

9. A method as claimed in claim 1, wherein the confirmation that the provider of the service is authenticated is provided via a cellular communication link between the cellular communications service provider and the communications device.

10. A computer system for a cellular telecommunications provider, comprising a processor arranged for:
    receiving an indication of potential use of a specified wireless hotspot of computer network services from a user of a communications device, the communications device configured to communicate with the cellular telecommunications provider and at least one wireless computer network;
    receiving a request for authentication of at least one provider of the computer network services at the specified wireless hotspot from the communications device;
    identifying wireless computer network services available at the specified wireless hotspot;
    authenticating the at least one provider of the wireless computer network services available at the specified wireless hotspot responsive to the request from the communications device; and
    preparing authentication information for use by the communications device in communicating with the at least one wireless computer network.

11. A computer system as claimed in claim 10, wherein in preparing the authentication information the processor is arranged for generating a cryptographic key.

12. A computer system as claimed in claim 10, wherein the processor is further arranged for receiving location information representing the location of the communications device, and for determining from the location information one or more wireless hotspots that are within a vicinity of the communications device.

13. A computer system as claimed in claim 12, wherein the processor is further arranged for (a) receiving a positive request for use of a service at the hotspot from the user, (b) commencing authenticating a provider of the service before the positive request is received and (c) preparing authentication information for use by the user after the positive request is received.

14. A computer system as claimed in claim 10, wherein, in authenticating the at least one provider of the wireless computer network services, the processor is arranged for verifying the trustworthiness of the at least one provider of the wireless computer network services.

15. A computer system as claimed in claim 10, wherein the computer system is further arranged to receive the indication of potential use via a call over a cellular communications network from the user via the cellular communications service provider.

16. A computer system as claimed in claim 10, wherein the computer system is further arranged to provide the authentication information to the communications device of the user via a cellular communication link between the cellular telecommunications provider and the communications device.

17. A non-transitory storage medium storing a computer-readable program code thereon, the computer-readable program code being arranged to cause a computer system of a cellular communications provider to:
    receive an indication of potential use of a specified wireless hotspot of wireless computer network services from a user of a communications device, the communications device being capable of communicating with the cellular telecommunications provider and at least one wireless computer network service provider;
    receive a request from the communications device for authentication of at least one provider of the computer network services at the specified wireless hotspot;

identify wireless computer network services available at the specified wireless hotspot;

authenticate the at least one provider of the wireless computer network services available at the specified wireless hotspot responsive to the request from the communications device; and prepare authentication information for provision to the communications device.

18. A non-transitory storage medium as claimed in claim 17, wherein the computer-readable program code arranged to cause the computer system of the cellular communications provider to authenticate the at least one provider of the wireless computer network services is arranged for verifying the trustworthiness of the at least one provider of the wireless computer network services.

19. A non-transitory storage medium as claimed in claim 17, further comprising computer-readable program code arranged to cause a computer system of the cellular communications provider to:

sense a direction the user is moving and alert the user of upcoming wireless computer network hotspots.

20. A method for operating a cellular telecommunications provider to authorize a wireless communications device to interface with a location-dependent wireless computer network service, the method comprising:

tracking the location of the wireless communications device;

determining that the wireless communications device is within a vicinity of and outside of an operating range of the location-dependent wireless computer network service;

authenticating a provider of the location-dependent wireless computer network service, wherein the provider of the location-dependent wireless computer network service facilitates interfacing of the wireless communications device to a computer network; and providing an identification of the authenticated provider of the location-dependent wireless computer network service to the wireless communications device.

21. A method as claimed in claim 20, further comprising receiving a request to use the location-dependent wireless computer network service by the user.

22. A method as claimed in claim 21, wherein authenticating the provider of the location-dependent wireless computer network service commences prior to receiving the request.

23. A method as claimed in claim 20, wherein authenticating the provider of the location-dependent wireless computer network service comprises verifying the trustworthiness of the provider of the service.

24. A method as claimed in claim 20, further comprising:

providing to the user additional wireless computer network services in the vicinity of the location of the user.

* * * * *